A. H. MOORHOUSE.
APPARATUS FOR PRODUCING VARIOUS SOUND EFFECTS FOR THEATRICAL AND LIKE PURPOSES.
APPLICATION FILED DEC. 7, 1909.

1,004,060.

Patented Sept. 26, 1911.

6 SHEETS—SHEET 1.

WITNESSES
J. P. Davis

INVENTOR
Albert Harrison Moorhouse
BY
ATTORNEYS

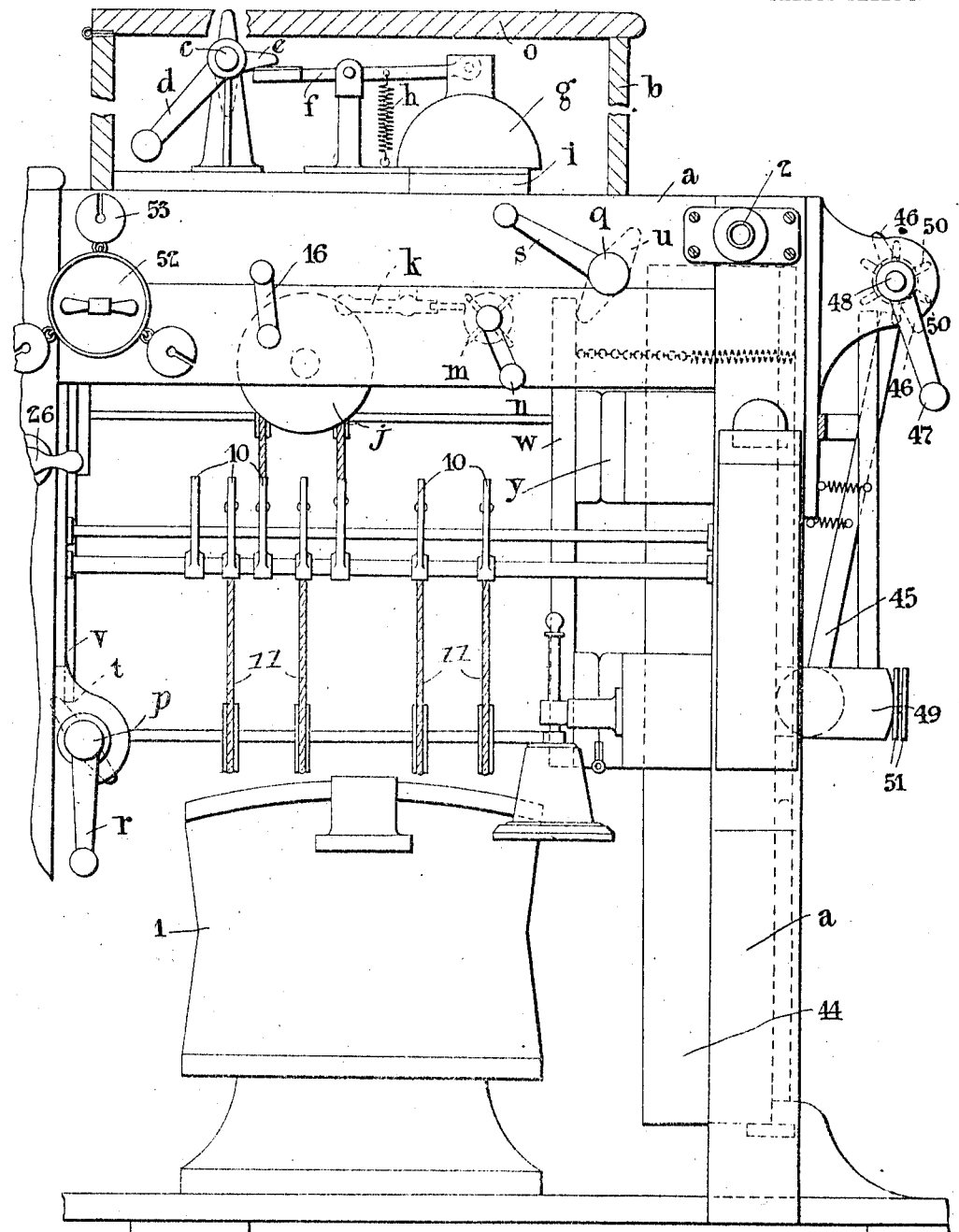

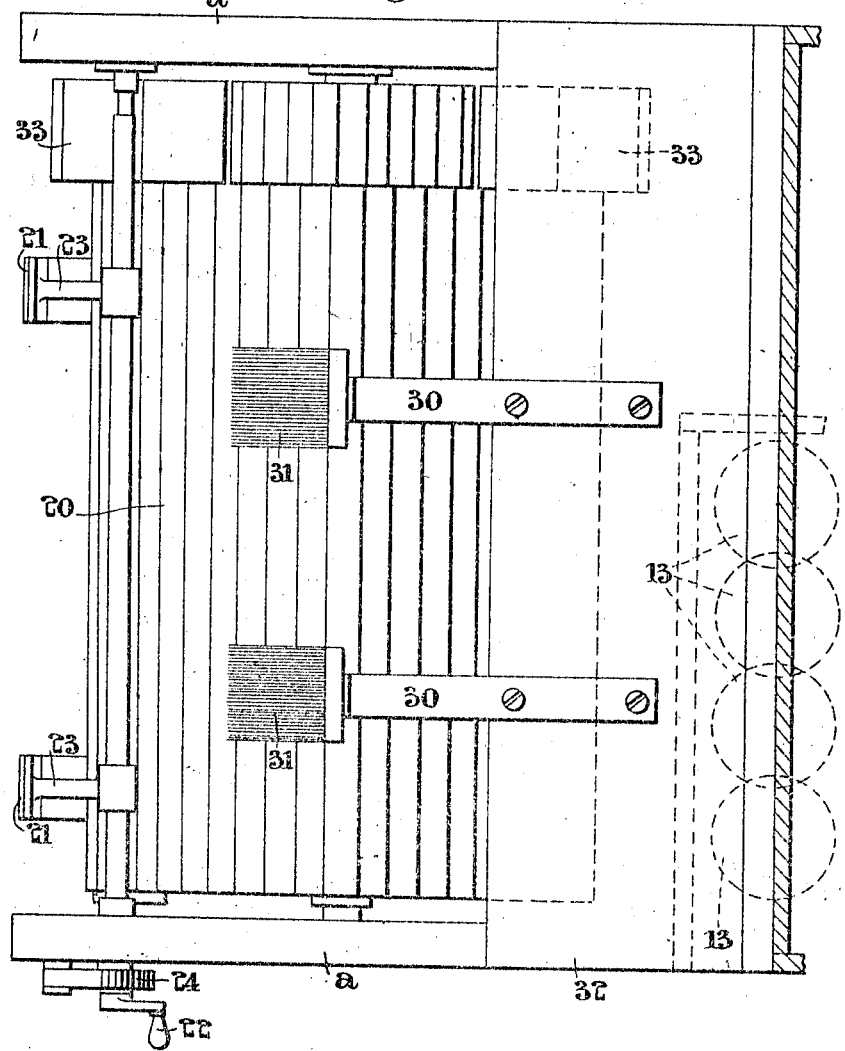

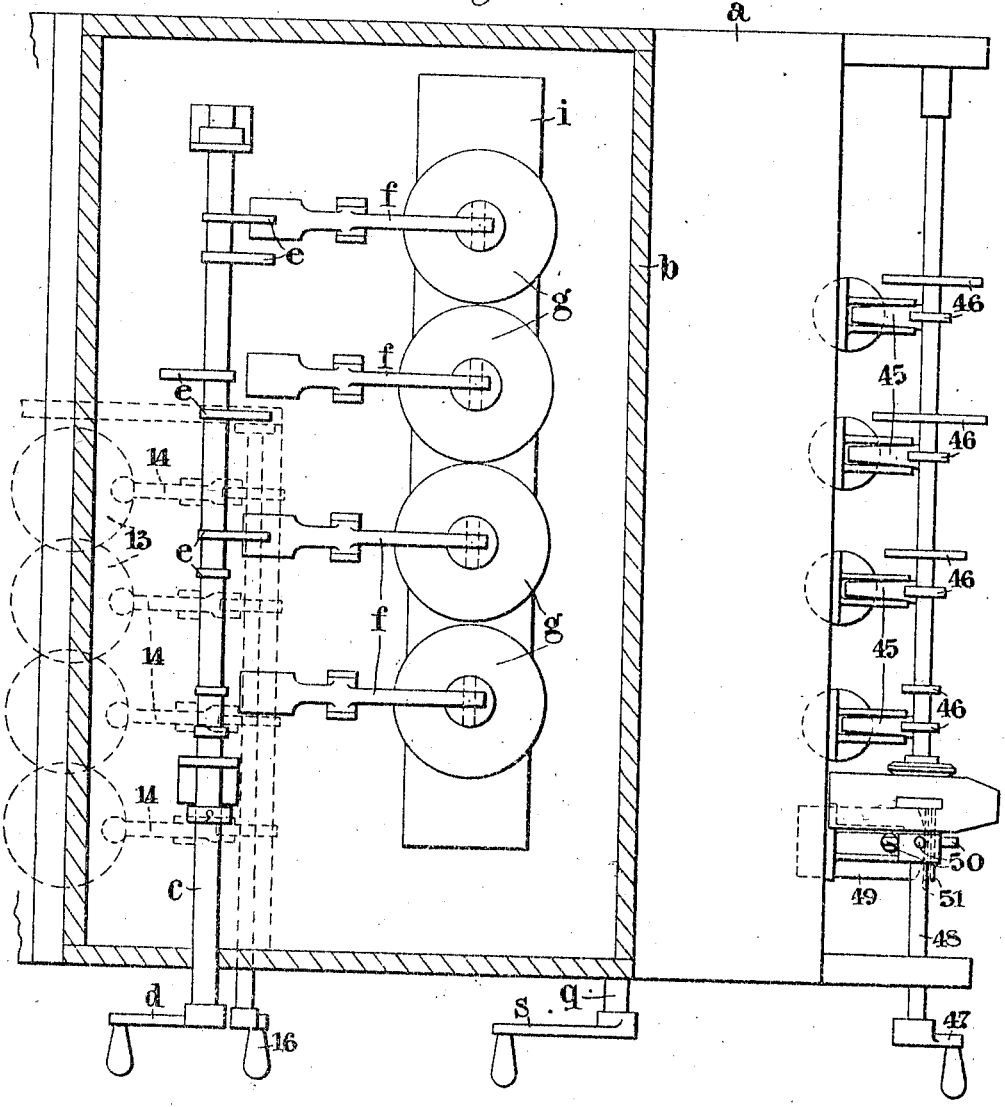

A. H. MOORHOUSE.
APPARATUS FOR PRODUCING VARIOUS SOUND EFFECTS FOR THEATRICAL AND LIKE PURPOSES.
APPLICATION FILED DEC. 7, 1909.

1,004,060.

Patented Sept. 26, 1911.

6 SHEETS—SHEET 5.

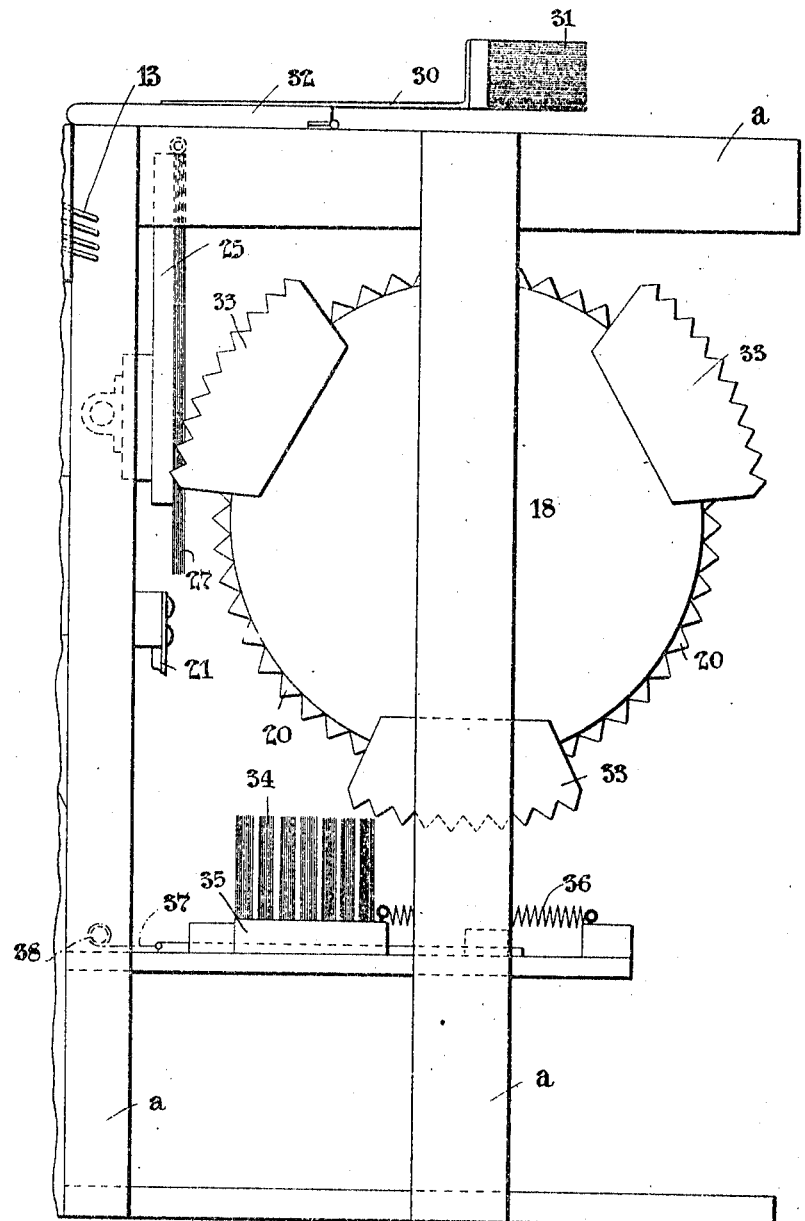

UNITED STATES PATENT OFFICE.

ALBERT HARRISON MOORHOUSE, OF STALEYBRIDGE, ENGLAND.

APPARATUS FOR PRODUCING VARIOUS SOUND EFFECTS FOR THEATRICAL AND LIKE PURPOSES.

1,004,060. Specification of Letters Patent. Patented Sept. 26, 1911.

Application filed December 7, 1909. Serial No. 531,758.

*To all whom it may concern:*

Be it known that I, ALBERT HARRISON MOORHOUSE, a subject of the King of Great Britain and Ireland, residing at Victoria Works, Bayley street, Staleybridge, in the county of Chester, England, engineer, have invented new and useful Improvements Relating to Apparatus for Producing Various Sound Effects for Theatrical and Like Purposes, of which the following is a specification.

This invention relates to apparatus for producing various sound effects for theatrical and like purposes, my apparatus being particularly advantageous for use in combination with kinematographs and the like for imitating the sounds that would be produced in the scenes that are being depicted.

The object of my invention is to produce an apparatus as aforesaid which shall be most effective in use and very compact in construction.

The invention comprises the improved combinations and arrangements of parts hereinafter described.

Figure 1:
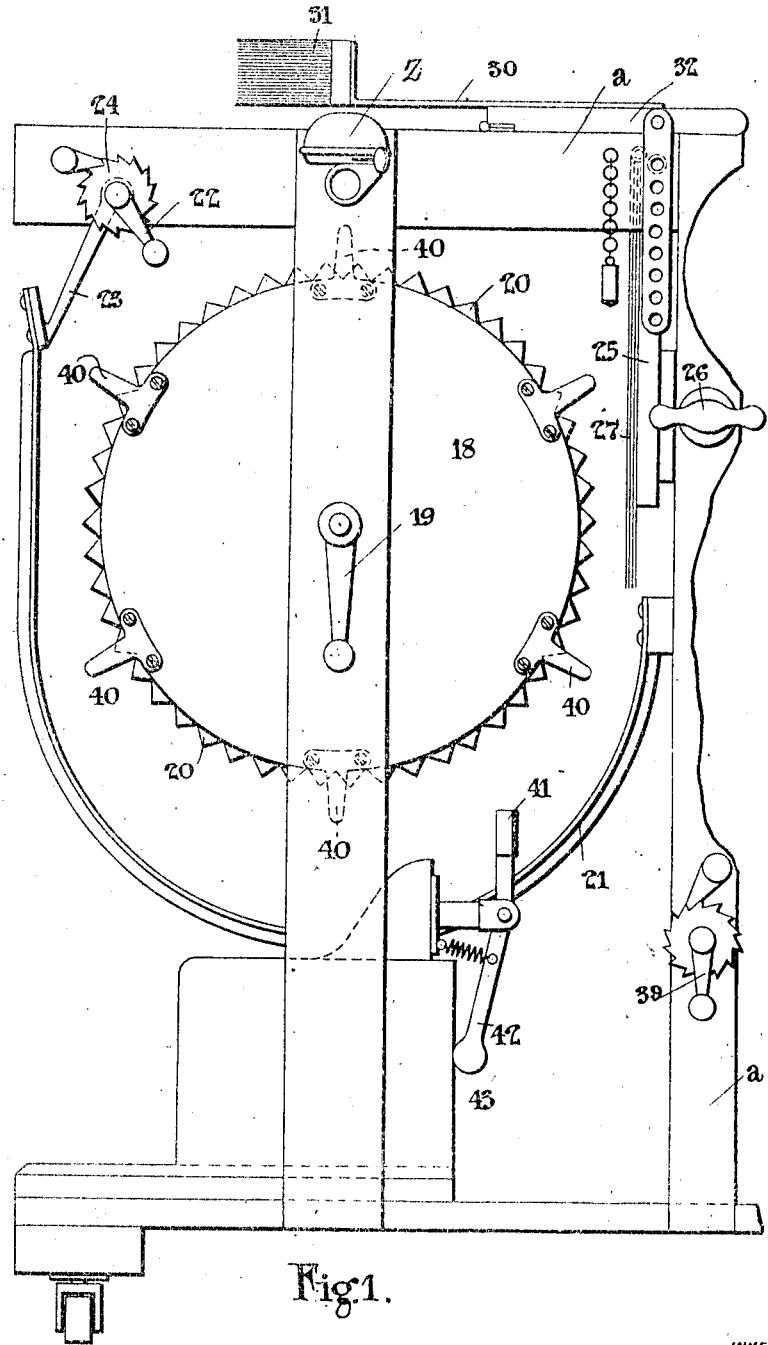
Figure 3:
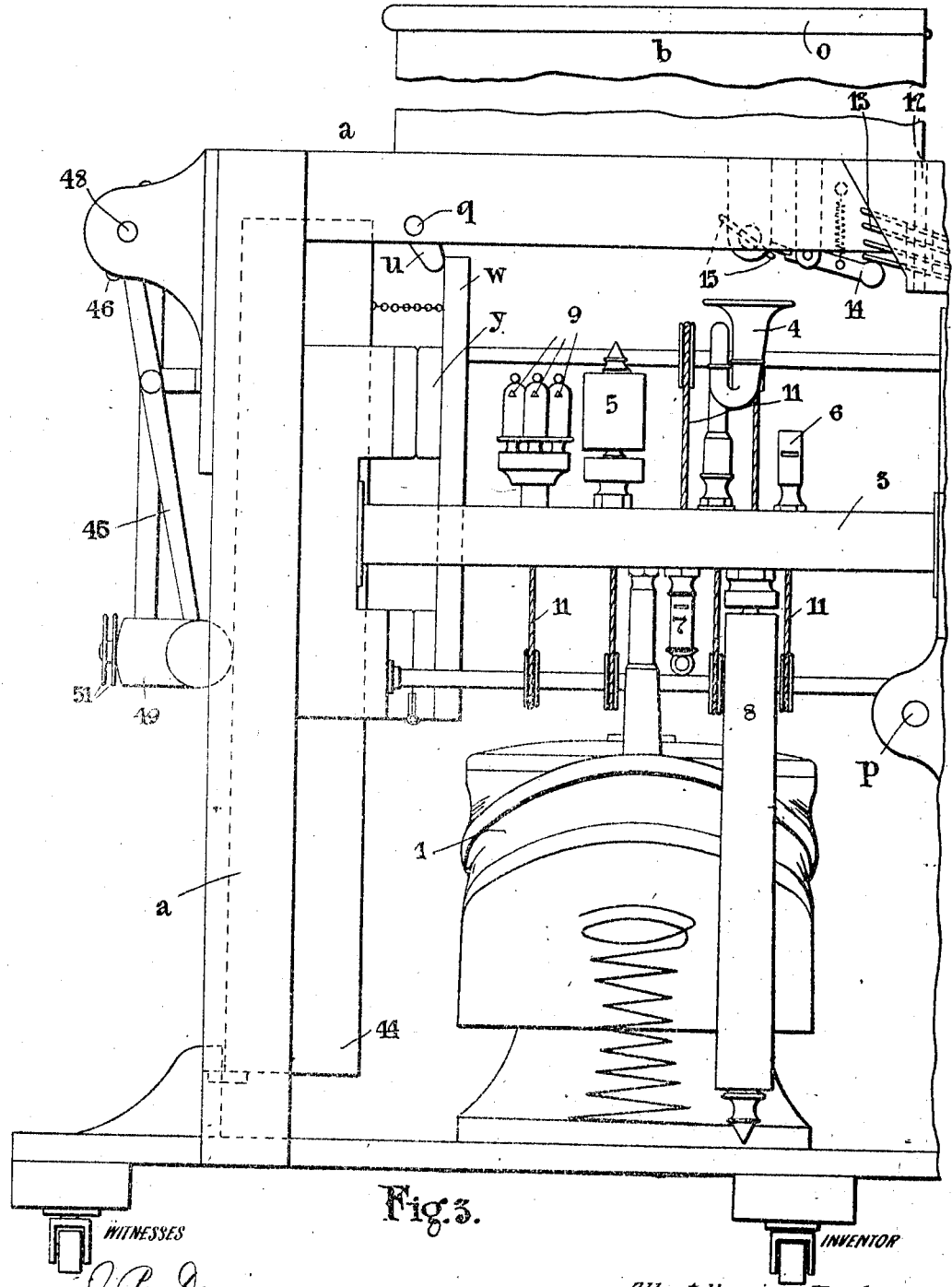

Referring to the accompanying sheets of explanatory drawings, which illustrate an apparatus constructed in accordance with my invention:—Figure 1 with 1ª is an end elevation partly in section, Fig. 2 with 2ª is a plan view partly in section, and Fig. 3 with 3ª an elevation looking at the opposite end of the apparatus to that illustrated at Fig. 1.

The same reference letters in the different views indicate the same parts.

Upon a frame or stand $a$ made of wood or metal I provide a box like casing $b$ through which passes a spindle $c$, having a crank handle $d$ at one end outside the box, and having arms or tappets $e$, $e$, adjustable in position, for engaging the ends of rocking levers $f$ carrying inverted cup like parts $g$ held by springs $h$ upon a stone, slate or other surface $i$. As the spindle $c$ is rotated the levers $f$ are depressed at one end against the action of said springs $h$ and released, when the aforesaid cups $g$, which may be made of hard wood, are brought into contact with the stone or slate surface $i$ beneath them, the effect produced resembling that of a horse walking or running. I preferably provide two sets of tappets $e$ upon said spindle $c$ and allow for the latter having a longitudinal movement for bringing one or other of said sets into position, for operating the rocking levers $f$ aforesaid, or for moving said tappets clear of the rocking lever ends. The two sets of tappets $e$ are so positioned with respect to one another as to cause the production of an effect resembling either a running or a galloping horse. If I wish to imitate the sound produced by a fire engine, I add to the sound of the horse or horses, that of a bell as $j$ which is struck by a lever $k$ engaged by tappets $m$. The latter are rotated by a handle $n$. I may provide each inverted cup like part $g$ with a muffled or other bell on its upper end for producing a sound resembling that produced by the harness when a horse is running. The box $b$ may be padded and may have a padded lid or cover $o$ which can be opened or closed to a greater or less extent according to the intensity of the sound required to be produced.

Upon spindles $p$ and $q$ actuated by handles $r$, $s$, I mount tappets $t$, $u$ which engage the ends of laths $v$, $w$ which act in the manner of blade springs so that as they are released by the tappets they strike stationary surfaces $x$, $y$ producing sounds resembling the breaking in of a door or doors or the like, or the firing of musketry. I however make no general claim to this portion of my invention.

I provide my apparatus with cycle and electric or continuously operating bells as $z$ and 2.

Upon a pipe or conduit 3 supplied with air under pressure by bellows 1, I mount a motor horn 4, a locomotive whistle 5, an ordinary whistle 6, a policeman's whistle 7, a steamer's whistle 8 and one or more rotating disk sirens 9, the latter producing a sound resembling the rushing and howling of the wind. All the said instruments are provided with spring controlled valves operated by handles 10, 10, (Fig. 1ª) through cords or wires 11. It will be seen that all the operating handles are arranged on the same side of my apparatus to assist the operator in his manipulation of the latter. The motor horn when supplied with air in a gradual manner produces a sound resembling a fog signal at sea.

I provide rods 12 upon which I support several metallic disks 13 capable of being struck by the ends of levers 14 operated by tappets 15 upon a shaft rotated by a handle 16, (see Fig. 1). The noise produced by this portion of my apparatus resembles that of breaking pottery or the like.

Upon a portion of the frame a I mount a revolving horizontal drum, or cylinder 18, rotated by a handle 19, and I provide, in conjunction with said drum 18, which is preferably made of wood with a corrugated periphery 20, two or more bands 21 of strong material preferably of the nature of card clothing as used in the opening of cotton, the back or smooth surface of said bands being adapted to be brought into contact with the drum surface 20 by rotating the handle 22 which raises the brackets 23 supporting the ends of 21. A pawl and ratchet arrangement 24 when in gear prevents backward rotation of the handle 22. The contact of said bands 21 with the corrugated drum produces a sound resembling the wind. I may also provide a plain wheel or disk which can be brought into or moved out of contact with the surface 20. When parts 34 (hereinafter referred to) are in operation and said wheel is rotating in contact with 20 the sound of the rattle of the train is added to that of the locomotive.

Upon a hinged board 25 actuated by a handle 26 I mount a series of short chains 27 having their lower ends free. By causing the chains 27 to come into contact with the drum 18 as it rotates, a noise can be produced resembling that of the sea as it recoils or flows back over the shingle, and then, on a quicker rotation of 18, a noise resembling the breaking of the waves on the sea shore. The combined effects of the chains 27 and bands 21 resemble that produced by a storm at sea.

I provide two or more arms 30 having metallic points 31, formed from short strips of metal, thereon which work in conjunction with the corrugated drum 18 just described. Said arms may be secured upon a hinged board 32, by the movement of which they can be caused to engage the surface of the corrugated drum. With this portion of my apparatus I can produce a sound similar to that produced by a locomotive when starting. To produce a sound resembling that of a running locomotive I employ corrugated plates 33 (see Fig. 3ᵃ) mounted upon the drum 18 which rub against metallic points 34 formed from short strips of metal mounted upon a slide 35 which is moved in one direction by a spring 36 and in the other direction by a wire 37 attached to a spindle 38 rotated by a handle 39 (see Fig. 1). The drum 18 also carries arms 40 which can engage the upper end 41 of a lever, the other end 42 of which strikes a box 43 for giving a sound resembling that produced when a quick firing gun is in action. The box 43 is adapted to be slid into and out of the position in which the arm 40 can engage the levers 41, 42 so as to put this part of my apparatus into and out of action. In the illustrated example, the box is in its out-of-service position.

Upon the end of my apparatus I place a drum 44 and I mount adjacent thereto several drum sticks or hammers 45 adapted to be actuated by tappets 46 rotated by a handle 47. Two sets of tappets 46 are preferably employed so that by sliding the shaft 48 into the position to bring one or other set into action all the hammers 45 will be actuated simultaneously or one after the other. The noise produced by the drum resembles that of thunder or of a cannon in action dependent upon the method of operating the hammers. I provide a hammer 49, operated by tappets 50 rotated by the handle 47, which carries loose metal disks 51, the effect produced when the hammer strikes the drum resembling that produced by a motor car in motion in which the exhaust discharge is distinctly heard. The shaft 48 can be slid into any one of three positions, in two of which the hammers 45, and in the other the hammer 49 are or is operated.

For producing the sound of sleigh bells, I place upon a padded roller 52 several bells 53 which, when the roller is rotated back and forth, strike the padded surface.

I may provide upon the apparatus means for discharging blank cartridges and also other convenient devices that may be found desirable.

By the employment of apparatus arranged and constructed as before described, all the effects usually required for accompanying a kinematographic exhibition can be produced in a ready and convenient manner.

I may vary the details of my apparatus to suit any particular requirements. If desired I may arrange for it to be operated by one or more electric motors with switches or control handles for the different effects.

Having now described my invention, what I claim as new and desire to secure by Letters Patent is:—

1. In combination, a rotating cylinder having a corrugated surface, bands for partly surrounding said cylinder, means for moving said bands into and out of contact with said cylinder, a plurality of chains, and means for moving the same into and out of contact with said cylinder, substantially as set forth.

2. In combination, a rotating cylinder having a corrugated surface, flexible bands, means for moving said bands into and out of contact with said cylinder, a plurality of chains, means for moving the same into and out of contact with said cylinder, and brush like metal strips with means for moving the same into and out of contact with said cylinder, substantially as set forth.

3. In combination, a rotating cylinder having a corrugated surface, flexible bands, means for moving said bands into and out of contact with said cylinder, a plurality of chains, means for moving said chains into and out of contact with said cylinder, brush like strips with means for moving the same into and out of contact with said cylinder, corrugated surfaces projecting from said cylinder, brush like strips for engaging said corrugated surfaces, and means for moving said strips into and out of their service position, substantially as set forth.

4. In combination, a rotating cylinder having a corrugated surface, flexible bands, means for moving said bands into and out of contact with said cylinder, a plurality of chains, means for moving said chains into and out of contact with said cylinder, brush like strips with means for moving the same into and out of contact with said cylinder, corrugated surfaces projecting from said cylinder, brush like strips for engaging said corrugated surfaces, means for moving said strips into and out of their service position, projecting arms upon said cylinder, a rocking lever, a striking surface for engagement by said lever, and means for causing the lever to be engaged by said arms, and to strike said surface, substantially as set forth.

In testimony whereof I have hereunto affixed my signature in the presence of two subscribing witnesses.

ALBERT HARRISON MOORHOUSE.

Witnesses:
ARTHUR HUGHES,
CHARLES CONRAD.